US010281898B2

(12) United States Patent
Skaggs et al.

(10) Patent No.: US 10,281,898 B2
(45) Date of Patent: May 7, 2019

(54) METHOD AND SYSTEM FOR CONTROLLING AUTOMATED OPERATIONS ON A WORKPIECE

(71) Applicant: The Boeing Company, Huntington Beach, CA (US)

(72) Inventors: Kirk Douglas Skaggs, Kent, WA (US); Lee Dwayne Lepper, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 652 days.

(21) Appl. No.: 14/801,396

(22) Filed: Jul. 16, 2015

(65) Prior Publication Data

US 2017/0017223 A1    Jan. 19, 2017

(51) Int. Cl.
*G05B 19/18*    (2006.01)

(52) U.S. Cl.
CPC .. *G05B 19/182* (2013.01); *G05B 2219/41109* (2013.01); *Y10S 901/43* (2013.01)

(58) Field of Classification Search
None
See application file for complete search history.

(56) References Cited

U.S. PATENT DOCUMENTS

| 4,578,846 A | 4/1986 | Schott et al. |
| 4,831,232 A | 5/1989 | Andersson et al. |
| 5,848,458 A * | 12/1998 | Bullen .................. B23P 21/004 29/33 K |
| 6,098,260 A | 8/2000 | Sarh |
| 6,580,978 B1 | 6/2003 | McTamaney |
| 2008/0027580 A1 | 1/2008 | Zhang et al. |
| 2008/0077276 A1* | 3/2008 | Montero Sanjuan .... B21J 15/14 700/245 |
| 2009/0118890 A1 | 5/2009 | Lin et al. |
| 2011/0160949 A1 | 6/2011 | Kondo |
| 2012/0011693 A1 | 1/2012 | Amirehteshami et al. |
| 2012/0179337 A1 | 7/2012 | Doan |
| 2014/0005873 A1 | 1/2014 | Chen et al. |

(Continued)

FOREIGN PATENT DOCUMENTS

| CN | 2883728 Y | 3/2007 |
| CN | 101804867 A | 8/2010 |

(Continued)

OTHER PUBLICATIONS

Richardson, R., "Integrated Laser and Optical Projection," AeroDef Manufacturing Conference and Exposition, Apr. 20-23, 2015, Dallas, TX (17 pgs).

(Continued)

*Primary Examiner* — Kenneth M Lo
*Assistant Examiner* — Istiaque Ahmed
(74) *Attorney, Agent, or Firm* — Armstrong Teasdale LLP

(57) ABSTRACT

A method of controlling at least one operation performed on a workpiece is provided. The method includes transmitting, from a first electronic reference device coupled to the workpiece, at least one operating parameter to at least one autonomous device. The method also includes performing, by the at least one autonomous device, the at least one operation on the workpiece in accordance with the received at least one operating parameter.

19 Claims, 5 Drawing Sheets

(56) References Cited

U.S. PATENT DOCUMENTS

2014/0025196 A1* 1/2014 Hain .................. B23K 9/202
                                                                                                      700/192

FOREIGN PATENT DOCUMENTS

| CN | 103434653 A | 12/2013 |
|---|---|---|
| WO | 2015094052 A1 | 6/2015 |

OTHER PUBLICATIONS

Kinard, D., "Advanced Manufacturing and the F-35 Lightning II," AeroDef Manufacturing Conference and Exposition, Apr. 20-23, 2015, Dallas, TX (19 pgs).

DuVal, A., "Laser Projection for Legacy Programs," AeroDef Manufacturing Conference and Exposition, Apr. 20-23, 2015, Dallas, TX (9 pgs).

European Search Report for related Application 16178601.7-1802 dated Dec. 6, 2016, 10 pp.

Gruver Wa: "Intelligent Robotics in Manufacturing, Service, and Rehabilitation: An Overview", IEEE Transactions on Industrial Electronics, IEEE Service Center, Piscataway, NJ, USA, vol. 41, No. 1, Feb. 28, 1994 (Feb. 28, 1994), pp. 4-11.

CA Office Action for related application 2,830,672 dated Nov. 22, 2018; 7 pp.

CN Office Action and Search Report for related application 2016105436849 dated Oct. 8, 2018, 17 pp.

* cited by examiner

METHOD AND SYSTEM FOR CONTROLLING AUTOMATED OPERATIONS ON A WORKPIECE

BACKGROUND

The field of the disclosure relates generally to the performance of automated operations on a workpiece, and, more particularly, to methods and systems for controlling automated operations on a workpiece.

Many structures, such as but not limited to aircraft, are manufactured, inspected, cleaned, repaired, and/or otherwise maintained at least partly using automated processes. At least some such processes, including but not limited to forming fastener openings in a workpiece, coupling fasteners to the workpiece, applying surface coatings to the workpiece, and performing inspections of particular locations on the workpiece, are performed by one or more automated devices. At least some such processes require workpiece-specific instructions to be conveyed to the automated device in order for the operations to be performed correctly. However, a speed and efficiency of at least some such automated processes are limited due to a need to transfer the intended set of instructions separately to the correct facility, match the intended set of instructions with a target workpiece, identify the specific automated devices that will be used on the target workpiece, and/or program or upload the instructions into the automated devices by a human operator prior to commencement of operations on the target workpiece. In addition, electronically storing and selecting among such instructions for multiple workpieces onboard the automated devices increases a size and complexity of onboard hardware and software. Moreover, for global manufacturing endeavors in which initial manufacture of the workpiece may occur at a facility located in one part of the world, and then subsequent manufacturing, repair, inspection, cleaning, and/or other operations on the workpiece may be performed at a facility in another part of the world, these factors may further be complicated by language barriers and/or differences in facility infrastructure.

BRIEF DESCRIPTION

In one aspect, a method of controlling at least one operation performed on a workpiece is provided. The method includes transmitting, from a first electronic reference device coupled to the workpiece, at least one operating parameter to at least one autonomous device. The method also includes performing, by the at least one autonomous device, the at least one operation on the workpiece in accordance with the received at least one operating parameter.

In another aspect, a system for performing at least one operation on a workpiece is provided. The system includes a first electronic reference device coupled to the workpiece. The first electronic reference device includes a memory configured to store at least one operating parameter associated with the at least one operation, and a transmitter configured to transmit the at least one operating parameter. The system also includes at least one autonomous device that includes a receiver configured to receive the at least one operating parameter from the transmitter of the first electronic reference device. The at least one autonomous device is configured to perform the at least one operation in accordance with the received at least one operating parameter.

The features, functions, and advantages that have been discussed can be achieved independently in various embodiments or may be combined in yet other embodiments, further details of which can be seen with reference to the following description and drawings.

DETAILED DESCRIPTION

Embodiments of the methods and systems described herein provide for electronic reference devices, such as but not limited to RFID devices, coupled to a workpiece. The electronic reference devices transmit operating instructions to autonomous devices configured to perform operations on the workpiece.

Unless otherwise indicated, "coupled" as used herein encompasses both elements that are associated directly and elements that are associated indirectly. For example, a member A coupled to a member B may be directly associated with a member B, or may be indirectly associated therewith, for example, via another member C. Moreover, unless otherwise indicated, reference to elements that are "coupled" together encompasses both elements that are fastened, adhered, or otherwise secured together, and elements that are coupled, for example by physical contact, in an unsecured fashion. Additionally, unless otherwise indicated, the terms "first," "second," etc. are used herein merely as labels, and are not intended to impose ordinal, positional, or hierarchical requirements on the items to which these terms refer. Reference to, for example, a "second" item does not require or preclude the existence of, for example, a "first" or lower-numbered item or a "third" or higher-numbered item. Additionally, unless otherwise indicated, approximating language, such as "generally" and "substantially," as used herein indicates that the term so modified may apply to only an approximate degree, as would be recognized by one of ordinary skill in the art, rather than to an absolute or perfect degree.

Figure 4:
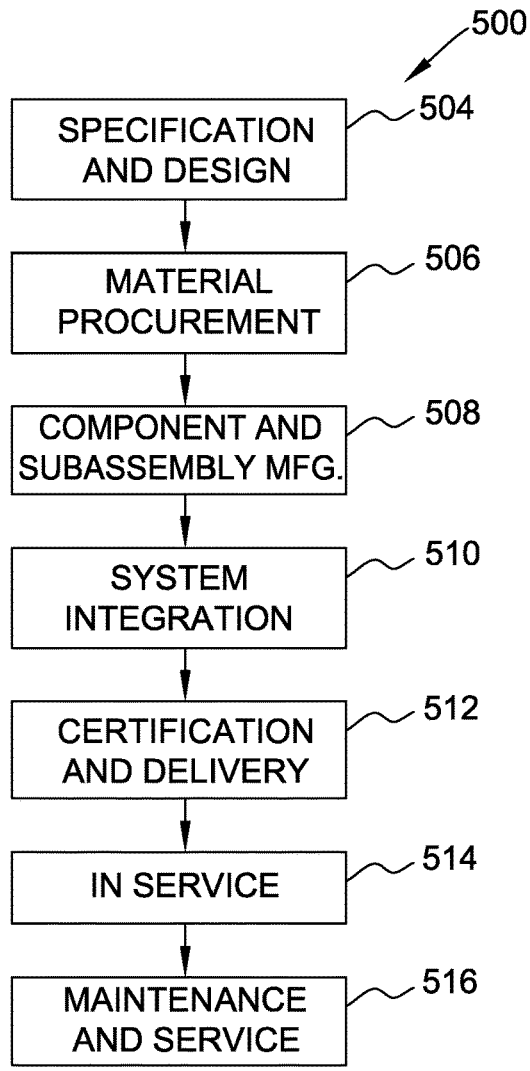
FIG. 4 is a flow diagram of an exemplary aircraft production and service methodology.
Figure 5:
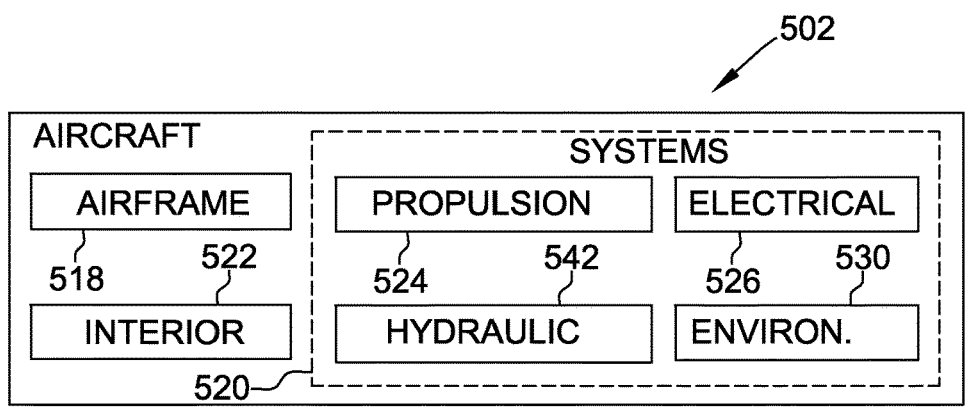
FIG. 5 is a schematic view of an exemplary aircraft.

Referring more particularly to the drawings, embodiments of the disclosure may be described in the context of an exemplary aircraft manufacturing and service method 500 as shown in FIG. 4 and an exemplary aircraft 502 as shown in FIG. 5. It should be understood, however, that although an aerospace example is shown, the principles of the disclosure may be applied to other structures virtually without limitation.

Figure 1:
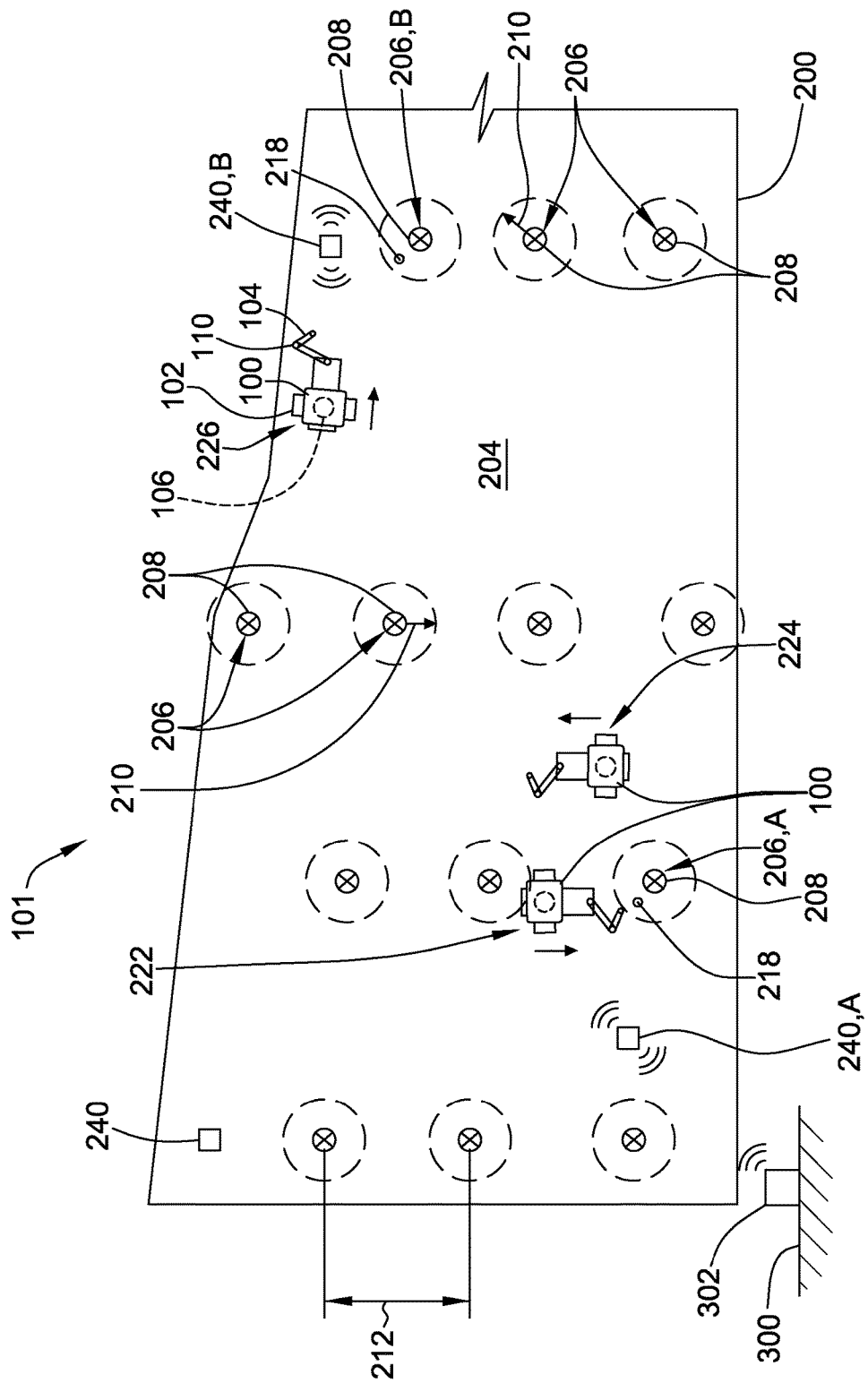
FIG. 1 is a schematic plan view of an exemplary embodiment of a system for performing at least one operation on a workpiece, illustrated on an exemplary embodiment of a workpiece that may be used with the exemplary aircraft shown in FIG. 4.

FIG. 1 is a schematic plan view of an exemplary embodiment of a system 101 for performing at least one operation on an exemplary embodiment of a workpiece 200. For example, but not by way of limitation, workpiece 200 is a component of a wing of aircraft 502. Workpiece 200 is disposed in any suitable fashion in an environment 300, such as but not limited to a manufacturing facility.

System 101 includes at least one autonomous device 100 positioned with respect to workpiece 200 and configured to perform operations on workpiece 200. For purposes of illustration, a first autonomous device 100 is illustrated at a first location 222 on workpiece 200, a second autonomous device 100 is located at a second location 224 on workpiece 200, and a third autonomous device 100 is located at a third location 226 on workpiece 200. Autonomous device 100 is initially positionable with respect to workpiece 200 in any suitable fashion that enables autonomous device 100 to function as described herein. Autonomous device 100 includes a drive system 102 that is capable of traversing autonomous device 100 along a surface 204 of workpiece 200.

In the illustrated embodiment, autonomous device 100 is substantially supported by workpiece 200. Moreover, in the illustrated embodiment, drive system 102 couples autonomous device 100 directly to surface 204 of workpiece 200. For example, but not by way of limitation, drive system 102 includes wheels or crawler tracks that traverse surface 204, such that autonomous device 100 traverses along workpiece 200. Alternatively, drive system 102 does not couple autonomous device 100 directly to surface 204. In some alternative embodiments, autonomous device 100 is substantially supported by, for example, a floor or ceiling of environment 300, and drive system 102 is coupled between autonomous device 100 and environment 300. For example, but not by way of limitation, autonomous device 100 is suspended from a track system (not shown) mounted in environment 300, and drive system 102 is configured to position autonomous device 100 on the track system to traverse autonomous device 100 along workpiece 200. For another example, but not by way of limitation, autonomous device 100 is coupled to a robotic arm (not shown) mounted in environment 300, and drive system 102 is configured to position the robotic arm to traverse autonomous device 100 along workpiece 200. In other alternative embodiments, drive system 102 is any other suitable drive system that enables autonomous device 100 to traverse along workpiece 200 as described herein.

Autonomous device 100 is configured to perform at least one automated operation on workpiece 200, such as any suitable manufacturing, repair, inspection, cleaning, and/or other operation. For example, but not by way of limitation, autonomous device 100 includes an end effector 104 that is configured to at least one of spray a coating on workpiece 200, form an opening in workpiece 200, insert a fastener into an opening in workpiece 200, and swage a head of a fastener coupled to workpiece 200. For example, but not by way of limitation, autonomous device 100 includes a camera that is configured to inspect at least one of a fastener opening, a fastener installation, and a coating application on workpiece 200. In some embodiments, autonomous device 100 is configured to transmit raw or processed inspection data to a storage and/or analysis device in environment 300.

Workpiece 200 includes a plurality of pre-selected target locations 206 at which the at least one operation is to be performed by at least one autonomous device 100. In certain embodiments, to facilitate traversal of autonomous device 100 along workpiece 200 to within operational distance of each target location 206, autonomous device 100 is guided by a suitable guidance system 302. In the illustrated embodiment, guidance system 302 is a laser-based system positioned in environment 300. Additionally or alternatively, guidance system 302 includes a GPS system. Additionally or alternatively, guidance system 302 includes a guidance material (not shown) positioned on workpiece 200 along a path that approaches target locations 206. Additionally or alternatively, guidance system 302 includes direct or remotely controlled positioning by a human operator. Autonomous device 100 is configured to receive information provided by guidance system 302 to be guided to within operational distance of target locations 206.

In some embodiments, to facilitate precise identification of target locations 206 by autonomous device 100, a plurality of precision target indicators 208 is positioned on workpiece 200. Each precision target indicator 208 is configured to be physically detectable by autonomous device 100. For example, but not by way of limitation, each precision target indicator 208 is a physical alteration in surface 204, such as a precision tack drill opening, and autonomous device 100 is suitably configured to optically detect a shape and size of the physical alteration. For another example, but not by way of limitation, each precision target indicator 208 is a magnetic fastener opening centerline field locator, and autonomous device 100 is suitably configured to magnetically detect the magnetic field generated.

Moreover, each precision target indicator 208 is associated with a corresponding target location 206. In the illustrated embodiment, for example, each precision target indicator 208 is co-located with a corresponding target location 206. In alternative embodiments (not shown), each precision target indicator 208 is located on workpiece 200 at a predetermined offset from a corresponding target location 206. For example, but not by way of limitation, in certain embodiments, autonomous device 100 is configured to drill an opening in workpiece 200 at each target location 206, and each precision target indicator 208 is co-located with a corresponding target location 206. For another example, but not by way of limitation, in certain embodiments, autonomous device 100 is configured to spray a coating on a portion of surface 204 between a first target location 206 and a second target location 206, and an associated precision target indicator 208 is positioned at each target location 206 to identify a precise starting and ending location for the spraying operation.

A detection distance 210 is defined for each precision target indicator 208 as a distance at which autonomous device 100 can reliably detect precision target indicator 208. Detection distance 210 is determined by the type of precision target indicators 208 and detection sensitivity of autonomous device 100. A region in which autonomous device 100 can reliably detect each precision target indicator 208 is illustrated in FIG. 1 by a corresponding dashed circle with a radius equal to detection distance 210. It should be understood that the detection region also extends hemispherically above surface 204 with radius equal to detection distance 210. In certain embodiments, to facilitate a reduction or elimination of interference in the detection of each precision target indicator 208, the type of precision target indicators 208 and the detection sensitivity of autonomous device 100 are selected such that the circles do not overlap, that is, such that a separation distance 212 between any two precision target indicators 208 is greater than twice detection distance 210.

In alternative embodiments, at least one target location 206 is not associated with a precision target indicator 208, and autonomous device 100 is configured to precisely locate the at least one target location 206 in any other suitable fashion that enables autonomous device 100 to function as described herein.

In certain embodiments, autonomous device 100 includes a servo system 110 operatively coupled to end effector 104. Servo system 110 is configured to position end effector 104 at target location 206. For example, but not by way of limitation, autonomous device 100 is configured to use information from guidance system 302 to traverse to a proximity location 218 within detection distance 210 of target location 206. In some embodiments, autonomous device 100 stops at proximity location 218, and servo system 110 positions end effector 104 at target location 206, for example but not by way of limitation, by detecting precision target indicator 208. After end effector 104 is suitably positioned, autonomous device 100 performs the at least one automated operation on workpiece 200, as described above. In alternative embodiments, autonomous device 100 does not stop its traversal along workpiece 200 prior to performing the at least one operation. For example, but not by way of limitation, as autonomous device 100 reaches proximity location 218, autonomous device 100 initiates one of a spraying operation and an inspection operation at target location 206 as autonomous device 100 continues to traverse workpiece 200.

Figure 2:
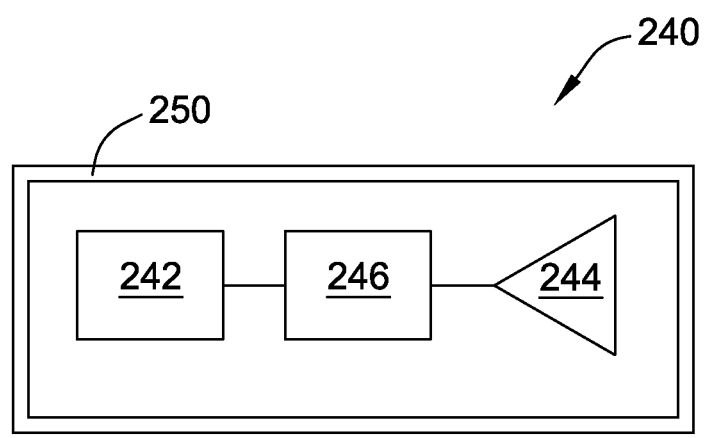
FIG. 2 is a schematic block diagram of an exemplary embodiment of an electronic reference device for use with the system shown in FIG. 1.

System 101 also includes at least one electronic reference device 240 coupled to workpiece 200. FIG. 2 is a schematic block diagram of an exemplary embodiment of electronic reference device 240. Each electronic reference device 240 includes a non-transitory memory 242 configured to store at least one operating parameter associated with the at least one operation performed by autonomous device 100. In addition, each electronic reference device 240 includes a suitable transmitter 244 configured to transmit the at least one operating parameter stored in memory 242. For example, electronic reference device 240 includes a suitable integrated circuit 246 coupled between memory 242 and transmitter 244. Alternatively or additionally, electronic reference device 240 includes any other suitable electronic components that enable electronic reference device 240 to function as described herein.

With reference to FIGS. 1 and 2, in certain embodiments, electronic reference device 240 is sized to reduce or eliminate a potential for physical interference with autonomous device 100. For example, but not by way of limitation, electronic reference device 240 is implemented as a low profile device, such that autonomous device 100 traverses over electronic reference device 240 on surface 204 without substantial physical interference. In alternative embodiments, electronic reference device 240 has any suitable size that enables system 101 to function as described herein. In some embodiments, electronic reference device 240 is provided on a thin adhesive backing 250 that is coupleable to surface 204. In alternative embodiments, electronic reference device 240 is coupled to workpiece 200 in any suitable fashion that enables system 101 to function as described herein.

In certain embodiments, electronic reference device 240 is coupled to workpiece 200 in a fashion that facilitates easy removal of electronic reference device 240 from workpiece 200 after at least one operation performed by autonomous device 100 is complete. In some such embodiments, autonomous device 100 is configured to remove electronic reference device 240, for example, as a final operation. In alternative embodiments, electronic reference device 240 is configured to remain positioned on workpiece 200 after the at least one operation is complete, for example, but not by way of limitation, to facilitate future manufacturing, repair, inspection, cleaning, and/or other operations.

Autonomous device 100 includes a suitable receiver 106 configured to receive the at least one operating parameter transmitted by transmitter 244. Autonomous device 100 is configured to perform the at least one operation in accordance with the received at least one operating parameter. In certain embodiments, the at least one operating parameter is a plurality of operating parameters, and electronic reference device 240 is configured to transmit the plurality of operating parameters in a predetermined sequence.

In some embodiments, electronic reference device 240 is configured as a suitable RFID device. Alternatively, electronic reference device 240 is configured other than as an RFID device. Moreover, in certain embodiments, electronic reference device 240 is configured as a passive device. For example, in the illustrated embodiment, electronic reference device 240 does not include an on-board power source coupled to memory 242 and transmitter 244, but rather transmitter 244 is configured to be inductively powered to transmit the contents of memory 242. In some such embodiments, transmitter 244 is inductively powered by an interrogation signal received from autonomous device 100 or, alternatively, from environment 300. For example, receipt of the interrogation signal induces transmitter 244 to emit a response signal, and integrated circuit 246 modulates the induced response signal to include the contents of memory 242. In alternative embodiments, electronic reference device 240 is an active device that includes a suitable on-board power source (not shown) coupled to transmitter 244. For example, electronic reference device 240 is configured to at least one of (i) transmit the at least one operating parameter periodically after an activation procedure, and (ii) transmit the at least one parameter in response to a received interrogation signal.

Autonomous device 100 is configured to locate each electronic reference device 240 in any suitable fashion that enables autonomous device 100 to function as described herein. For example, guidance system 302 is configured to guide autonomous device 100 to within a range of electronic reference device 240 suitable for receiving transmissions from electronic reference device 240. For another example, a transmission range of electronic reference device 240 is sufficient to communicate with autonomous device 100 at any position along workpiece 200.

As stated above, electronic reference device 240 is configured to transmit at least one operating parameter associated with an operation to autonomous device 100, and autonomous device 100 is configured to receive the at least one transmitted operating parameter and to perform at least one automated operation on workpiece 200, such as any suitable manufacturing, repair, inspection, cleaning, and/or other operation, in accordance with the received at least one operating parameter. A number of non-limiting example embodiments of the types of operations that autonomous devices 100 perform according to instructions received from electronic reference device 240 follows. For example, in some embodiments, at least one autonomous device 100 has end effector 104 that is a machine tool, and the at least one operating parameter includes at least one machine tool operating parameter. In some such embodiments, end effector 104 includes a drill, and the at least one operating parameter includes at least one of a drill feed rate, a drill spindle speed, and a drill orbital speed. For another example, in some embodiments, at least one autonomous device 100 includes a sprayer, and the at least one operating parameter includes at least one of a target thickness of a sprayed coating, a sprayer fluid pressure, and a sprayer flow rate. For another example, in certain embodiments, at least one autonomous device 100 has end effector 104 configured to couple a fastener to workpiece 200, and the at least one operating parameter includes at least one of a fastener type, a fastener diameter, a fastener overall length, and a fastener grip length to be used. Autonomous device 100 is configured to select the fastener to be coupled in accordance with the received at least one operating parameter. For another example, in some embodiments, at least one autonomous device 100 includes a camera, and the at least one operating parameter includes at least one of an instruction to start video, an instruction to stop video, and an instruction to take one or more photographs.

In some embodiments, system 101 is configured to perform a selected operation differently at different target locations 206. For example, the at least one selected operation is to be performed with different parameters at a target location A and at a target location B on workpiece 200. A first electronic reference device 240 proximate target location A, designated with an A in FIG. 1, stores at least one operating parameter A in memory 242. A second electronic reference device 240 proximate target location B, designated with a B in FIG. 1, stores at least one operating parameter B in memory 242. Autonomous device 100 is configured to perform the at least one operation at target location A in accordance with the received at least one operating parameter A, and to perform the at least one operation at target location B in accordance with the received at least one operating parameter B. For example, the at least one operation is forming an opening in workpiece 200, the at least one operating parameter A causes an opening of a first size to be formed at target location A, and the at least one operating parameter B causes an opening of a second size to be formed at target location B.

Additionally or alternatively, in some embodiments, electronic reference device 240 transmits at least one operating parameter that facilitates ensuring that autonomous device 100 performs the at least one operation selectively only at certain target locations 206. For example, in some embodiments, at least one autonomous device 100 is configured to perform the at least one operation only at selected target locations 206 that are fewer than all target locations 206 associated with precision target indicators 208, and the at least one operating parameter is an indicator of a proximity of the selected target locations 206. Alternatively or additionally, electronic reference device 240 is configured to transmit at least one operating parameter that instructs the at least one autonomous device 100 to skip over or ignore certain precision target indicators 208 in any suitable fashion that facilitates ensuring that the at least one operation is performed only at the selected target locations 206.

In certain embodiments, autonomous device 100 is configured to traverse along workpiece 200 during the at least one operation, and the at least one operating parameter includes at least one of a direction, a distance, and a speed at which autonomous device 100 is to traverse along workpiece 200. For example, the at least one operation includes at least one of a spraying operation and an inspection operation.

In certain embodiments, electronic reference device 240 is further configured to provide additional information to enable each at least one autonomous device 100 to perform the correct operation at the correct target location 206. For example, a plurality of autonomous devices 100 are configured to traverse workpiece 200 simultaneously, with different ones of autonomous devices 100 configured to perform different operations on workpiece 200. Each electronic reference device 240 is further configured to transmit an associated electronic reference device identifier along with the at least one operating parameter, and each autonomous device 100 is configured to apply the at least one operating parameter and/or to perform the at least one operation for which it is configured only if the electronic reference device identifier matches a predetermined value. For example, autonomous device 100 receives a transmission from a first electronic reference device 240, and the electronic reference device identifier of first electronic reference device 240 does not match the predetermined value. Autonomous device 100 continues traversing along workpiece 200, ignoring precision target indicators 208, and receives a transmission from a second electronic reference device 240 with an electronic reference device identifier that matches the predetermined value. Autonomous device 100 performs the at least one operation for which it is configured only at subsequent target locations 206.

For another example, electronic reference device 240 is configured to transmit an end effector code with the at least one operating parameter. The end effector code identifies a type of end effector 104 associated with the at least one operating parameter. Autonomous device 100 is configured to apply the at least one operating parameter to its operations if autonomous device 100 has end effector 104 of the indicated type, and to ignore the at least one operating parameter if autonomous device 100 does not have end effector 104 of the indicated type. For example, electronic reference device 240 transmits the end effector code for an orbital drill, and the at least one operating parameter including values for a drill feed rate, a drill spindle speed, and a drill orbital speed. Each autonomous device 100 that receives the transmission compares the end effector code to its own known end effector 104. If autonomous device 100 has end effector 104 that is an orbital drill, autonomous device 100 applies the drill feed rate, drill spindle speed, and drill orbital speed. If autonomous device 100 includes end effector 104 that is other than an orbital drill, autonomous device 100 ignores the transmitted operating parameters.

In certain embodiments, the at least one operation includes a first operation and a second operation, and the at least one operating parameter includes a first operating parameter associated with the first operation and a second operating parameter associated with the second operation. In some such embodiments, the at least one autonomous device 100 includes a first autonomous device 100 configured to perform the first operation on workpiece 200, and a second autonomous device 100 configured to perform the second operation on workpiece 200. Moreover, a first electronic reference device 240 is configured to transmit each of the first and second operating parameters with a separate indicator, such as a separate operation code or end effector code as described above. The first autonomous device 100 is configured to perform the first operation in accordance with the received first operating parameter associated with a first operation code or first end effector code, and the second autonomous device 100 is configured to perform the second operation in accordance with the received second operating parameter associated with a second operation code or second end effector code.

In some embodiments, autonomous device 100 is configured to monitor its compliance with the at least one operating parameter during the operation, and to store or transmit the compliance data to a storage and/or analysis device in environment 300.

Figure 3A:
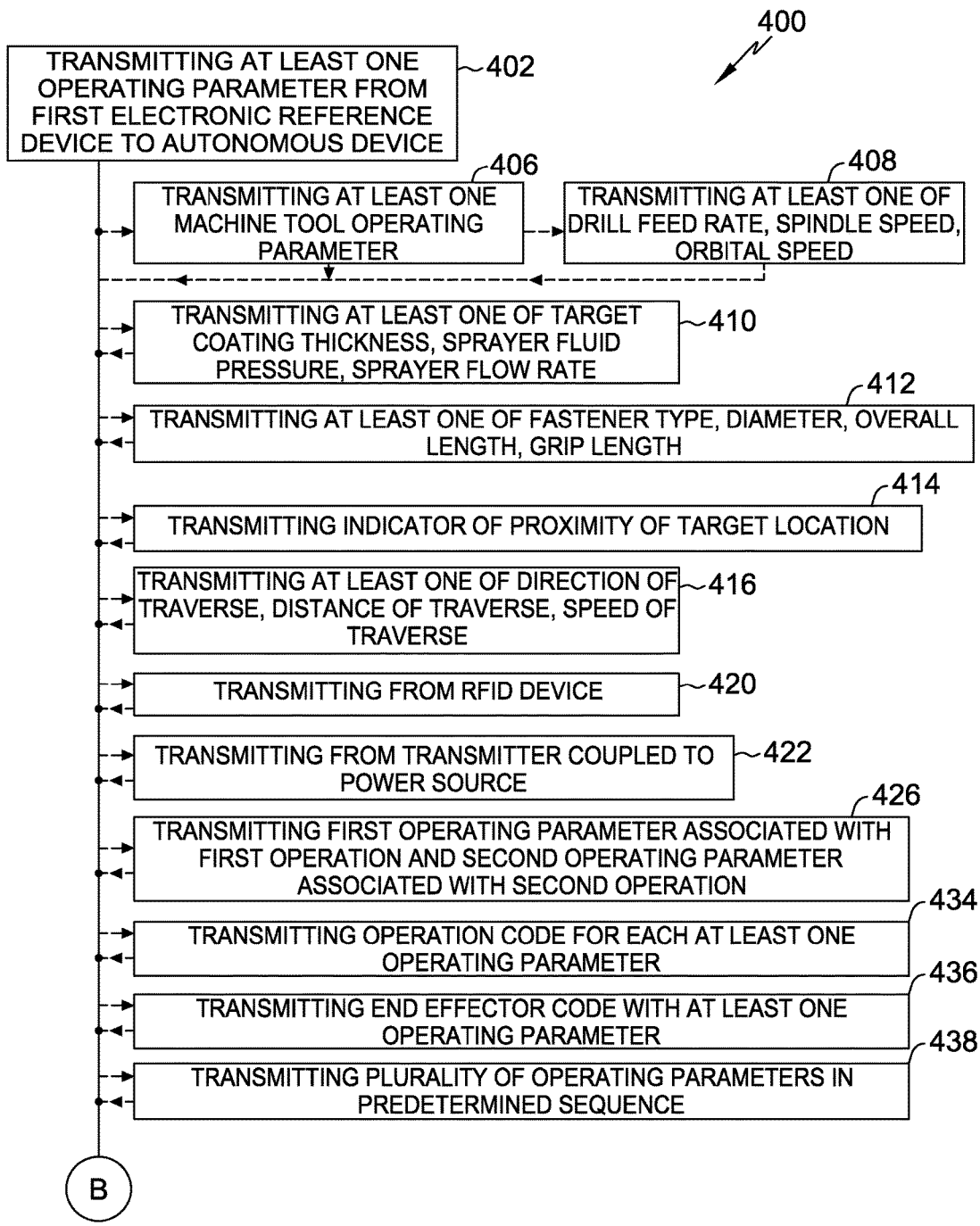
FIGS. 3A and 3B are a flow diagram of an exemplary embodiment of a method of controlling at least one operation performed on a workpiece, such as the workpiece shown in FIG. 1.
Figure 3B:
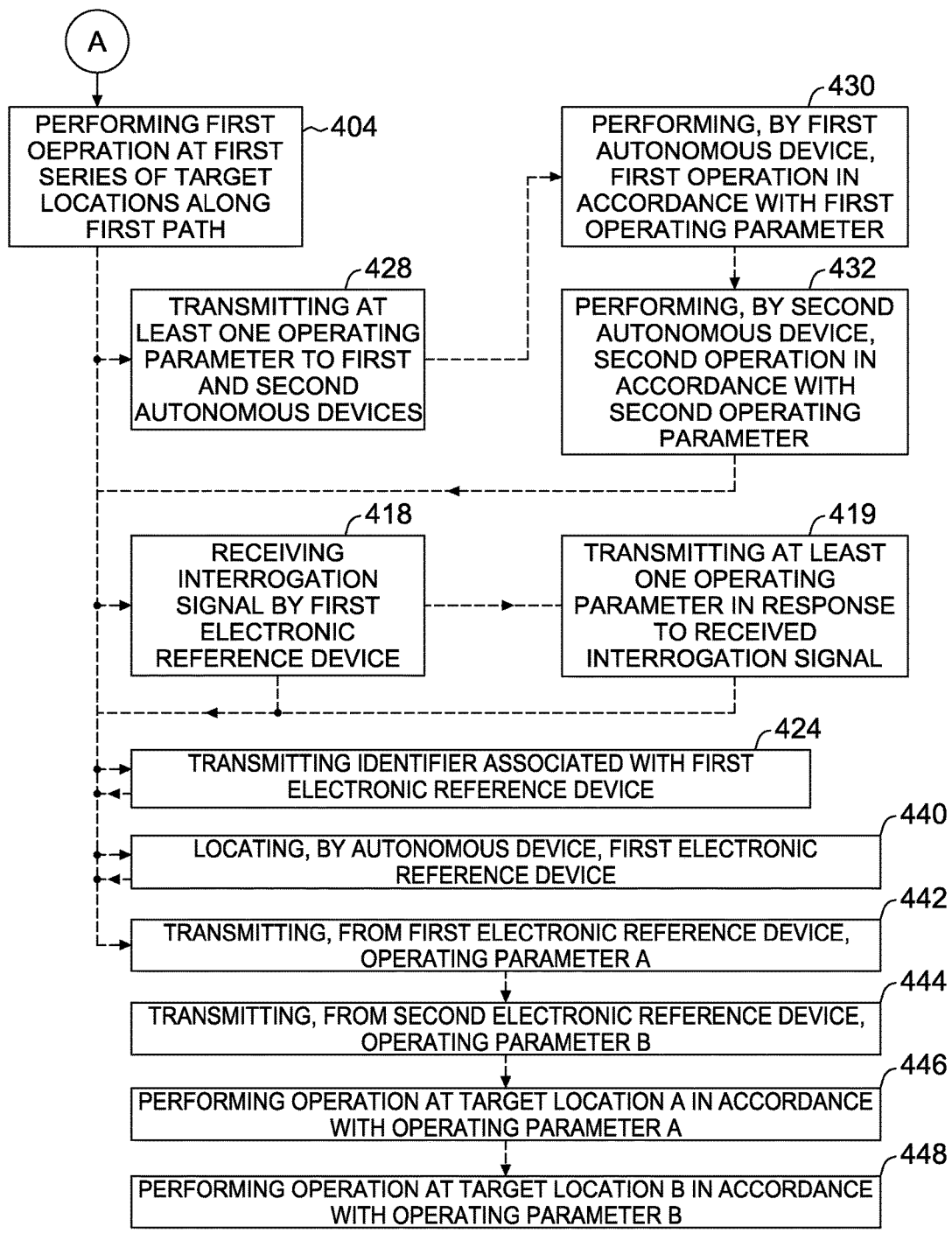

FIGS. 3A and 3B are a flow diagram of an exemplary embodiment of a method 400 of controlling at least one operation performed on a workpiece, such as workpiece 200.

With reference also to FIGS. 1 and 2, in the exemplary embodiment, method 400 includes transmitting 402, from a first electronic reference device, such as a first electronic reference device 240, coupled to the workpiece at least one operating parameter to at least one autonomous device, such as autonomous device 100. Method 400 also includes performing 404, by the at least one autonomous device, the at least one operation on the workpiece in accordance with the received at least one operating parameter.

In some embodiments, an end effector, such as end effector 104, of the at least one autonomous device includes a machine tool, and the step of transmitting 402 the at least one operating parameter includes transmitting 406 at least one machine tool operating parameter. In some such embodiments, the machine tool includes a drill, and the step of transmitting 406 the at least one machine tool operating parameter includes transmitting 408 at least one of a drill feed rate, a drill spindle speed, and a drill orbital speed.

In certain embodiments, the at least one autonomous device includes a sprayer and the at least one operation includes spraying a coating onto the workpiece, and the step of transmitting 402 the at least one operating parameter includes transmitting 410 at least one of a target coating thickness, a sprayer fluid pressure, and a sprayer flow rate. In some embodiments, an end effector, such as end effector 104, of the at least one autonomous device is configured to couple a fastener to the workpiece, and the step of transmitting 402 the at least one operating parameter includes transmitting 412 at least one of a fastener type, a fastener diameter, a fastener overall length, and a fastener grip length.

In some embodiments, the at least one operation is performed at a target location, such as target location 206 on the workpiece, and the step of transmitting 402 the at least one operating parameter includes transmitting 414 an indicator of a proximity of the target location. In certain embodiments, the at least one operation includes traversing the at least one autonomous device along the workpiece, and the step of transmitting 402 the at least one operating parameter comprises transmitting 416 at least one of a direction of the traverse, a distance of the traverse, and a speed of the traverse. For example, the at least one operation includes at least one of a spraying operation and an inspection operation.

In certain embodiments, method 400 further includes receiving 418 an interrogation signal by the first electronic reference device, and the step of transmitting 402 the at least one operating parameter includes transmitting 419 the at least one operating parameter in response to the received interrogation signal. In some embodiments, the step of transmitting 402 the at least one operating parameter includes transmitting 420 the at least one operating parameter from an RFID device.

In certain embodiments, the step of transmitting 402 the at least one operating parameter includes transmitting 422 the at least one operating parameter from a transmitter, such as transmitter 244, of the first electronic reference device, and the transmitter is coupled to a power source of the first electronic device.

In some embodiments, method 400 also includes transmitting 424, by the first electronic reference device, an identifier associated with the first electronic reference device.

In certain embodiments, the at least one operation includes a first operation and a second operation, and the step of transmitting 402 the at least one operating parameter includes transmitting 426 a first operating parameter associated with the first operation and a second operating parameter associated with the second operation. In some such embodiments, the at least one autonomous device includes a first autonomous device and a second autonomous device, the step of transmitting 402 the at least one operating parameter includes transmitting 428 the at least one operating parameter to each of the first and second autonomous devices, and the step of performing 404 the at least one operation includes performing 430, by the first autonomous device, the first operation on the workpiece in accordance with the received first operating parameter, and performing 432, by the second autonomous device, the second operation on the workpiece in accordance with the received second operating parameter.

In some embodiments, method 400 also includes transmitting 434, by the first electronic reference device, an operation code for each at least one operating parameter. The operation code identifies a corresponding operation associated with each at least one operating parameter. In certain embodiments, method 400 also includes transmitting 436, by the first electronic reference device, an end effector code with the at least one operating parameter. The end effector code identifies a type of end effector associated with the at least one operating parameter.

In certain embodiments, the step of transmitting 402 the at least one operating parameter includes transmitting 438 a plurality of operating parameters in a predetermined sequence.

In some embodiments, method 400 further includes locating 440, by the at least one autonomous device, the first electronic reference device.

In certain embodiments, the at least one operation is to be performed at a target location A on the workpiece and at a target location B on the workpiece. The step of transmitting 402 the at least one operating parameter includes transmitting 442, from the first electronic reference device, at least one operating parameter A. Method 400 also includes transmitting 444, from a second electronic reference device, such as a second electronic reference device 240, coupled to the workpiece, at least one operating parameter B to the at least one autonomous device. The step of performing 404 the at least one operation on the workpiece includes performing 446 the at least one operation at target location A in accordance with the received at least one operating parameter A, and performing 448 the at least one operation at target location B in accordance with the received at least one operating parameter B.

Referring to the exemplary aircraft manufacturing and service method 500 as shown in FIG. 4 and the exemplary aircraft 502 as shown in FIG. 5, during pre-production, exemplary method 500 may include specification and design 504 of the aircraft 502 and material procurement 506. During production, component and subassembly manufacturing 508 and system integration 510 of the aircraft 502 takes place. Thereafter, the aircraft 502 may go through certification and delivery 512 in order to be placed in service 514. While in service by a customer, the aircraft 502 is scheduled for routine maintenance and service 516 (which may also include modification, reconfiguration, refurbishment, and so on).

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 5, the aircraft 502 produced by exemplary method 500 may include an airframe 518 with a plurality of systems 520 and an interior 522. Examples of high-level systems 520 include one or more of a propulsion system 524, an electrical system 526, a hydraulic system 528, and an environmental system 530. Any number of other systems may be included. Although an aerospace example is shown, the principles of the invention may be applied to other industries, such as the automotive industry.

Apparatus and methods embodied herein may be employed during any one or more of the stages of the production and service method 500, and particularly during at least one of material procurement 506, component and subassembly manufacturing 508, system integration 510, in service 514, and routine maintenance and service 516 for airframe 518 and/or interior 522, for example. For example, one or more system embodiments, method embodiments, or a combination thereof may be utilized during the material procurement stage 506 and production stages 508 and 510, for example, in the selection, fabrication, and manufacture of components or subassemblies for airframe 518 and/or interior 522, thereby substantially expediting assembly of or reducing the cost of an aircraft 502. Similarly, one or more of system embodiments, method embodiments, or a combination thereof may be utilized while the aircraft 502 is in service 514, for example and without limitation, as part of maintenance and service 516. For example, replacement or repair of components or subassemblies of airframe 518 and/or interior 522 may be fabricated or manufactured in a manner similar to production process 508. For example, but not by way of limitation, the systems and methods provide for rapid, low-cost replacement or repair of a component of airframe 518 and/or interior 522.

The embodiments described herein provide improvements over at least some known methods and systems for controlling operations performed on a workpiece. The embodiments described herein provide for electronic reference devices, such as but not limited to RFID devices, coupled to a workpiece. The electronic reference devices transmit operating instructions to autonomous devices configured to perform operations on the workpiece. The embodiments described herein provide for workpiece-specific instructions to be conveyed to the automated device along with the workpiece itself, reducing or eliminating a need to transfer the intended set of instructions separately to the correct facility, match the intended set of instructions with a target workpiece, identify the specific autonomous devices that will be used on the target workpiece, and/or program or upload the instructions into the autonomous devices by a human operator prior to commencement of operations on the target workpiece. In addition, the embodiments described herein facilitate reducing a size and complexity of onboard storage and processing of multiple specialized sets of instructions for the automated device. Moreover, the embodiments described herein facilitate overcoming language barriers and/or differences in facility infrastructure at different manufacturing facilities in which the operations occur.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of controlling at least one operation performed on a workpiece, said method comprising:
   locating, by at least one autonomous device using a guidance system, a first electronic reference device;
   transmitting, from the first electronic reference device physically coupled directly to the workpiece, at least one operating parameter to at least one autonomous device;
   receiving, by the at least one autonomous device, at least one operating parameter from the first electronic reference device;
   traversing, by the at least one autonomous device, to a location on the workpiece based on the at least one operating parameter received by the at least one autonomous device; and
   performing, by the at least one autonomous device, the at least one operation at the location on the workpiece in accordance with the received at least one operating parameter.

2. The method of claim 1, wherein an end effector of the at least one autonomous device includes a machine tool, said transmitting the at least one operating parameter comprises transmitting at least one machine tool operating parameter.

3. The method of claim 2, wherein the machine tool includes a drill, said transmitting the at least one machine tool operating parameter comprises transmitting at least one of a drill feed rate, a drill spindle speed, and a drill orbital speed.

4. The method of claim 1 further comprising removably coupling the first electronic reference device directly to a surface of the workpiece.

5. The method of claim 1 further comprising autonomously driving the autonomous device across a surface of the workpiece.

6. The method of claim 5, wherein autonomously driving the autonomous device comprises autonomously driving the autonomous device using a guidance system to facilitate traversal of the autonomous device along the workpiece surface.

7. The method of claim 1 further comprising storing the at least one operating parameter on the electronic reference device.

8. The method of claim 1 wherein autonomously driving the device comprises autonomously driving the device over the electronic reference device.

9. A system for performing at least one operation on a workpiece, said system comprising:
   a first electronic reference device coupled directly to a surface of the workpiece, said first electronic reference device comprising a memory configured to store at least one operating parameter associated with the at least one operation, and a transmitter configured to transmit the at least one operating parameter;
   at least one autonomous device comprising a receiver configured to receive the at least one operating parameter from said transmitter of said first electronic reference device, said at least one autonomous device configured to perform the at least one operation in accordance with the received at least one operating parameter;

a plurality of precise target indicators coupled to the surface of the workpiece, wherein each precise target indicator is physically detectable by the at least one autonomous device; and a guidance system for guiding the at least one autonomous device to the first electronic reference device and for guiding the at least one autonomous device to at least one of the plurality of precise target indicators in accordance with the at least one operating parameter.

10. The system of claim 9, wherein said at least one autonomous device comprises a machine tool, and the at least one operating parameter includes at least one machine tool operating parameter.

11. The system of claim 10, wherein said machine tool comprises a drill, and the at least one operating parameter includes at least one of a drill feed rate, a drill spindle speed, and a drill orbital speed.

12. The system of claim 9, wherein said first electronic reference device is removably coupled to the surface of the workpiece.

13. The system of claim 9, wherein said at least one autonomous device comprises a drive system to facilitate traversing said at least one autonomous device along the workpiece surface, wherein said drive system couples said at least one autonomous device directly to the workpiece surface.

14. The system of claim 9 further comprising a plurality of pre-selected target locations on the workpiece, wherein each pre-selected target location is physically detectable by said at least one autonomous device.

15. A method of controlling an autonomous device, said method comprising:

locating, by a device using a guidance system, an electronic reference device;

autonomously driving the device across a surface of a workpiece to within an operational range of the electronic reference device;

receiving, by the device, at least one operating parameter from the electronic reference device physically coupled to the workpiece;

autonomously driving the device to at least one of a plurality of precise target indicators coupled to the workpiece in accordance with the received at least one operating parameter; and performing, by the device at the at least one precise target indicator, at least one operation in accordance with the received at least one operating parameter.

16. The method of claim 15 further comprising storing the at least one operating parameter onto the electronic reference device.

17. The method of claim 15, wherein an end effector of the device includes a machine tool, said receiving the at least one operating parameter comprises receiving at least one machine tool operating parameter, wherein the machine tool includes a drill, said receiving the at least one machine tool operating parameter comprises receiving at least one of a drill feed rate, a drill spindle speed, and a drill orbital speed.

18. The method of claim 15, wherein performing comprises performing a guidance instruction resulting in traversal of the device along the workpiece in accordance with the received at least one operating parameter.

19. The method of claim 15 further comprising removably coupling the electronic reference device directly to the surface of the workpiece.

* * * * *